United States Patent [19]

Rueffer et al.

[11] Patent Number: 5,014,597
[45] Date of Patent: May 14, 1991

[54] VACUUM BRAKE POWER BOOSTER WITH METAL CUP SUPPORTING REACTION DISK

[75] Inventors: Manfred Rueffer, Sulzbach; Bernd Toepperwien, Rossdorf, both of Fed. Rep. of Germany; Vladimir Dusil, Weiterstadt, Czechoslovakia

[73] Assignee: Alfred Teves GmbH, Frankfurt am Main, Fed. Rep. of Germany

[21] Appl. No.: 474,914

[22] Filed: Feb. 5, 1990

[30] Foreign Application Priority Data

Feb. 16, 1989 [DE] Fed. Rep. of Germany ....... 3904641

[51] Int. Cl.⁵ ............................ B60T 13/52; F15B 9/10
[52] U.S. Cl. .................................................. 91/369.2
[58] Field of Search ................. 91/369.1, 369.2, 369.3, 91/369.4

[56] References Cited

U.S. PATENT DOCUMENTS

| | | | |
|---|---|---|---|
| 4,417,500 | 11/1983 | Hayashida | 91/369.2 |
| 4,437,390 | 3/1984 | Ohta | 91/369.2 X |
| 4,447,897 | 5/1984 | Boehm | 91/369.4 |
| 4,572,055 | 2/1986 | Schiel | 91/369.2 |
| 4,583,446 | 4/1986 | Morimoto | 91/369.2 |
| 4,729,287 | 3/1988 | Boehm et al. | 91/369.2 |
| 4,757,749 | 7/1988 | Gautier | 91/369.4 |
| 4,819,544 | 4/1989 | Wagner | 91/369.4 |
| 4,892,027 | 1/1990 | Wagner et al. | 91/369.2 |
| 4,898,073 | 2/1990 | Seip et al. | 91/369.2 |

Primary Examiner—John T. Kwon
Assistant Examiner—John Ryznic
Attorney, Agent, or Firm—Robert P. Seitter; J. Gordon Lewis

[57] ABSTRACT

A metal cup accommodating a reaction disc and the end of a push rod is fixed with respect to a control valve housing of a vacuum brake power booster. The manner of fixation is of simple design, allowing the parts to be manufactured at low cost and offering ease of mounting. According to the invention a metal cup is supported in axial direction at the front side of the control valve housing and is retained by a retaining clip in a positive locking fit with the control valve housing.

16 Claims, 4 Drawing Sheets

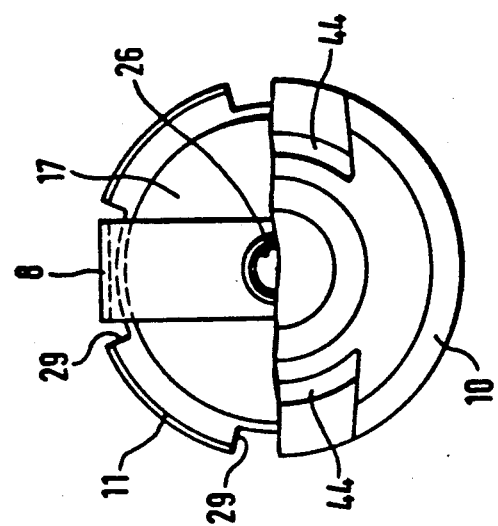
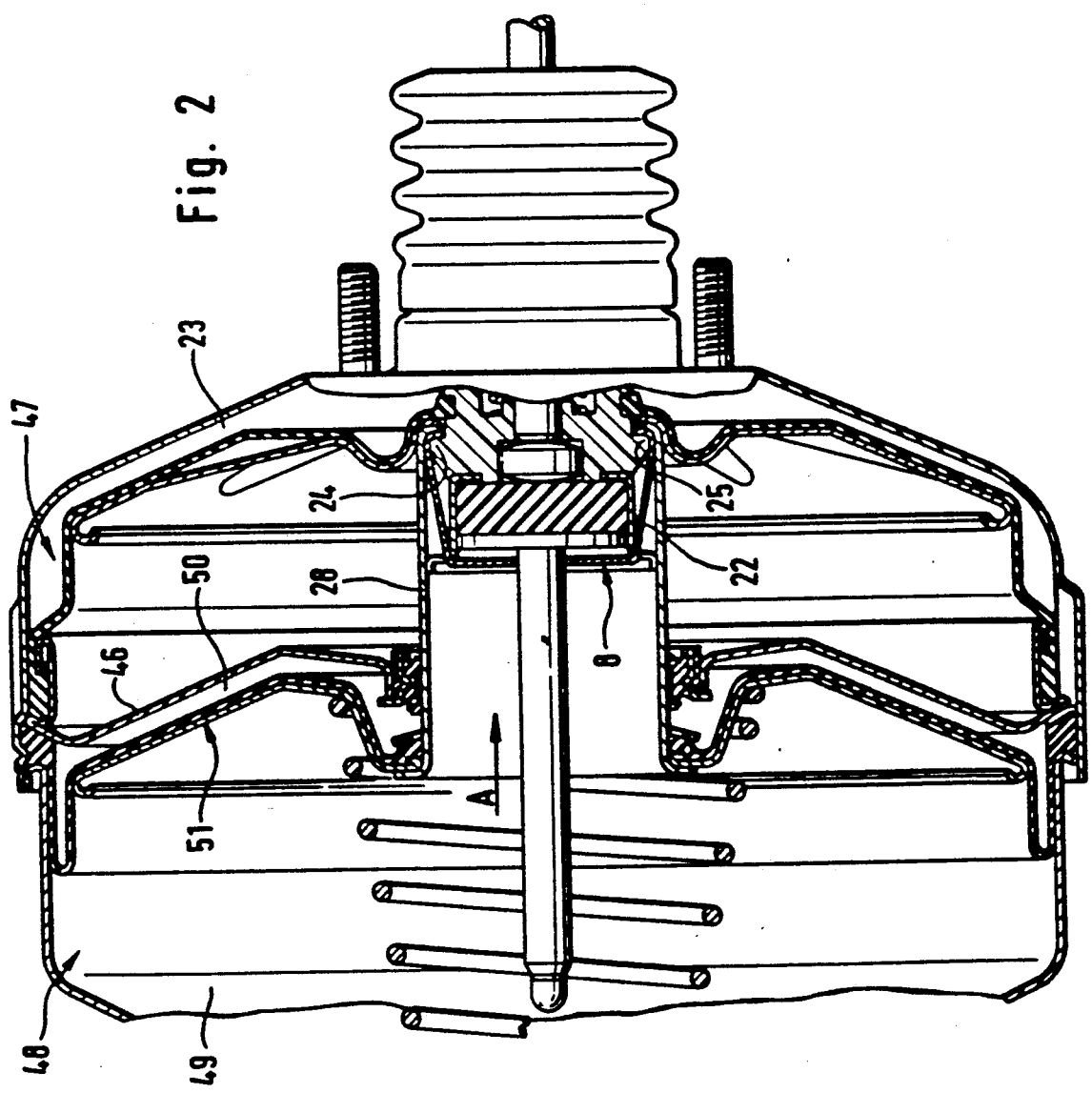

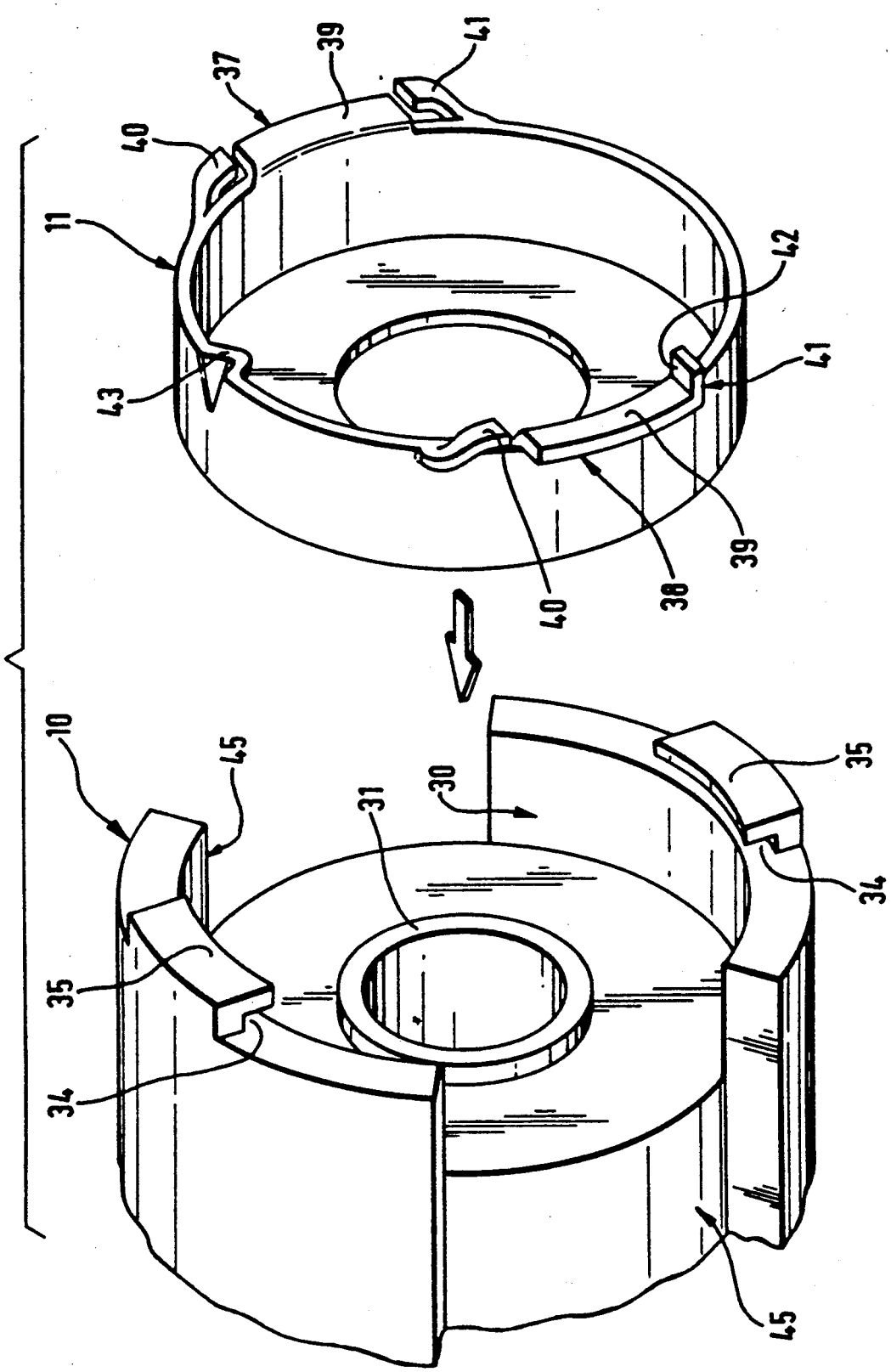

VACUUM BRAKE POWER BOOSTER WITH METAL CUP SUPPORTING REACTION DISK

BACKGROUND OF THE INVENTION

The invention relates to a vacuum brake power booster for automotive vehicles, with a housing which is sealingly subdivided into at least one vacuum chamber and at least one power chamber by at least one axially movable wall. The axially movable wall is pre-stressed by means of a return spring, and has a mechanically actuatable control valve serving to connect the power chamber to the vacuum chamber, and to the atmosphere. An axially movable control valve housing is made of thermoplastic material and is furnished with a metal cup that accommodates a reaction disc of high-elasticity material and a push rod abutted against the reaction disc. The push rod transmits the brake power to an actuating piston of a master cylinder that is positioned on the vacuum side of the housing of the brake power booster.

A vacuum brake power booster of this kind is known from German Patent Application No. 29 18 907, which was published without examination. In German Application No. 29 18 907, the metal cup is screwed into the control valve housing with a sealing ring interposed and is furnished with a radial flange. A diaphragm disc, forming the movable wall, is retained at the control valve housing in axial direction by the radial flange.

In the aforementioned vacuum brake power booster, the screwed union provided between the metal cup and the control valve housing, and the kind of sealing used involves elevated manufacturing and assembly costs, that have to be considered less advantageous.

SUMMARY OF THE INVENTION

It is, therefore, the object of the present invention to provide, in a vacuum brake power booster, a simple design for fixing the metal cup in the control valve housing. The design allows the parts to be manufactured at low cost and offers ease of assembly, while maintaining simultaneously the reliable operation of the brake power booster.

According to the invention, this object is achieved by axially supporting the metal cup at the front side of the control valve housing and retaining the metal cup by means of a retaining clip which is in a positive locking fit with the control valve housing.

In one embodiment of the invention, the retaining clip is formed by a U-shaped bracket with a central through opening for the push rod and with arms connecting at their ends behind two projections disposed radially opposite each other on the control valve housing. This configuration achieves an effective guidance of the push rod and protects against its falling out.

A considerable simplification of the control assembly of the vacuum brake power booster is obtained in that, adjacent the metal cup, the control valve housing is provided with an annular collar whose height or axial length is slightly larger than the material thickness of the metal cup to form a sealing surface that interacts with the reaction disc.

According to another advantageous feature of the invention, the reliability of operation is increased in that the ends of the retaining clip are radially secured by a diaphragm disc that forms the movable wall and is fixed to the control valve housing.

In particular, in a brake power booster of tandem design whose second movable wall is connected to the control valve housing by means of a guide tube, a major improvement of the guidance of the control valve housing, and a reduction of the risk of buckling out of the push rod, is attained in that the outside diameter of the metal cup corresponds to the inside diameter of the guide tube. The metal cup is also formed with radial cutouts and, in the range of fixation of the guide tube at the control valve housing, the retaining clip is secured in radial direction by the guide tube.

In accordance with another version of the vacuum brake power booster, in which the metal cup is positioned within a cylindrical recess in the control valve housing, the object of the invention is attained in that the bottom of the recess is furnished with an annular collar whose height or axial length is slightly larger than the material thickness of the metal cup to form a sealing surface that interacts with the reaction disc. In this configuration, the metal cup is secured in the axial direction by means of a retaining member that is slidable into the control valve housing in the radial direction. As a result of this configuration, the push rod is protected from falling out.

In an advantageous development of the subject matter of the present invention, the retaining member has a U-shaped configuration. The retaining member has arms engaging within grooves provided in the control valve housing bounded by two annular segment-shaped retaining elements positioned radially opposite each other at the control valve housing. In this context, the control valve housing is furnished, in the range between the retaining elements, with axial cutouts extending to the bottom of the recess and into air guide ducts formed in the control valve housing. These provisions allow large cross-sectional areas for the air flow, and the release times of the brake power booster are thereby reduced to a considerable extent.

An improved guidance of the control valve housing in a tandem design of the brake power booster is achieved in that the retaining member is formed with guide edges which interact with the inside wall of the guide tube.

A simplified design of the vacuum brake power booster is attained by a further feature of the present invention wherein the metal cup is provided at its edge with at least two locking apparatuses arranged opposite each other which interact with the retaining elements that are formed on the control valve housing.

Finally, in order to obtain protection against the push rod falling out, it is contemplated that one embodiment the metal cup may be formed with radial depressions in its edge ranges positioned between the locking apparatuses.

BRIEF DESCRIPTION OF THE DRAWINGS

FIG. 2 shows a longitudinal section through a tandem-design vacuum brake power booster with the first mode of fixation of the metal cup according to the invention;

FIG. 3 shows a view of the control assembly in the direction of arrow A in FIG. 2;

FIG. 7 shows a representation in perspective of a third embodiment of the invention.

DETAILED DESCRIPTION OF THE PREFERRED EMBODIMENTS

Figure 1:
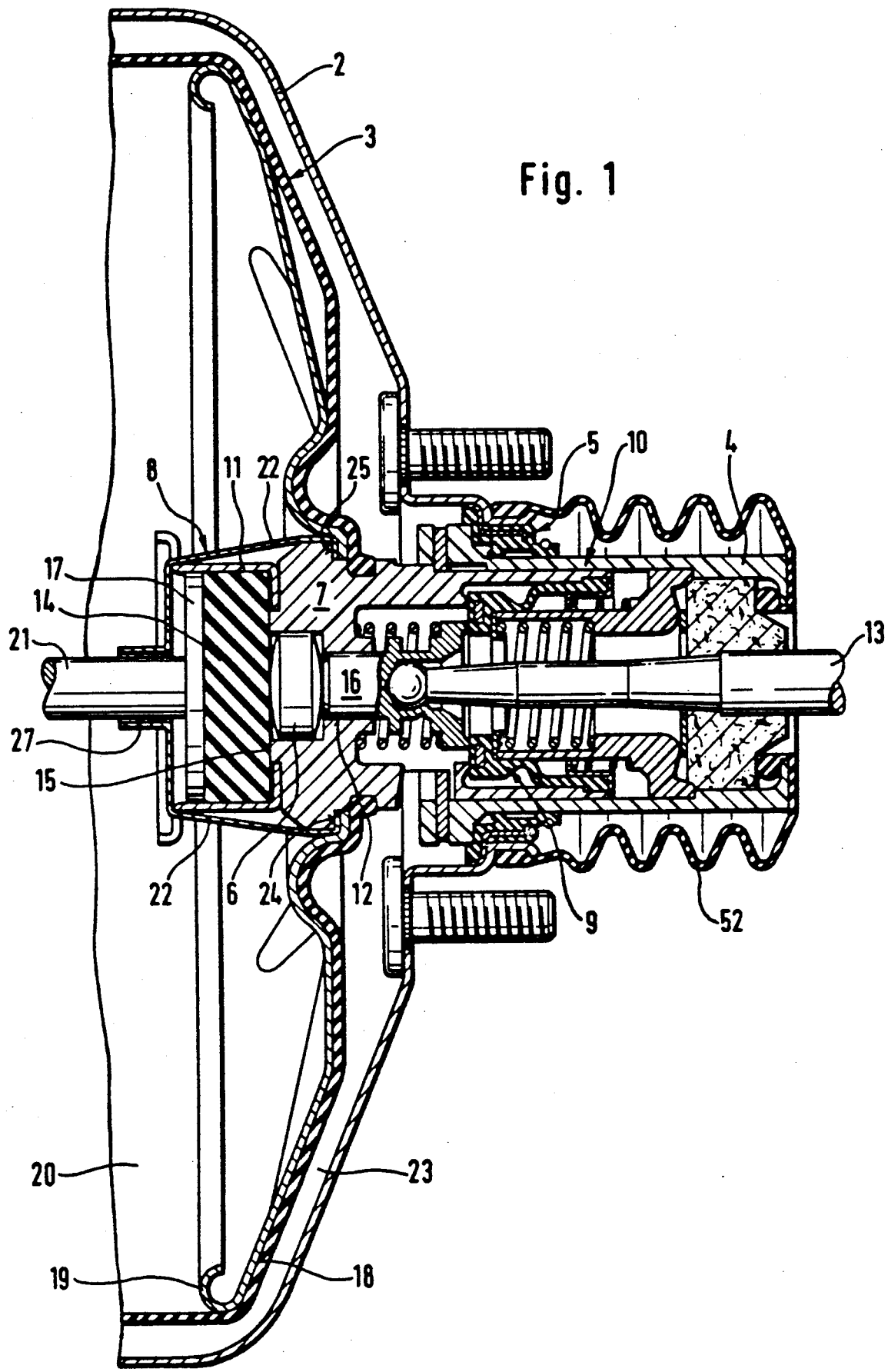
FIG. 1 shows a longitudinal section through a first embodiment of a vacuum brake power booster depicting one mode of fixation of the metal cup according to the invention.

The housing of the vacuum brake power booster shown in FIG. 1 is comprised of two parts which are coupled together at a point of connection. Only the brake pedal-side housing 2 is partly illustrated for clarity. The interior space of the housing is subdivided by a movable wall 3 into a vacuum chamber 20 which is connected through a connecting bore to a vacuum source (not shown in more detail in the drawing), and a power chamber 23. The movable wall 3 is formed by a diaphragm disc 19 and by a rolling diaphragm 18 adhering to it in the power chamber 23. The movable wall 3 is fastened to a control valve housing 10, shown as a two-part assembly in the example illustrated in the drawing, so that the rolling diaphragm 18 straddles with its inner portion the internal edge of the diaphragm disc 19 and seals it with respect to the control valve housing 10. With its cylindrical guide section 4, the control valve housing 10 projects from the booster housing 2 and is protected by means of a boot 52 against soiling of its surface. The control valve housing 10 seals off the power chamber 23 toward the atmosphere by means of a slip guide ring 5.

A control rod, including a piston rod 13 and a valve piston 16, is axially slidably positioned within the interior space of the control valve housing 10. The control rod is connectable through a clevis (not shown in detail in the drawing) to the brake pedal of an automotive vehicle. The control valve housing 10, furthermore, contains a control valve arrangement 9 which is actuated by the valve piston 16 and which controls through ducts the pressure differential between the vacuum chamber 20 and the power chamber 23. The front section 7 of the control valve housing 10 is positioned in the vacuum chamber 20 and is formed with a stepped bore 12 which accommodates a transmission disc 6 and the valve piston 16. At the front face of the front section 7, a metal cup 11 is axially retained by means of a retaining clip 8. A high-elasticity reaction disc 14 and a thrust plate 17 are arranged in metal cup 11. A push rod 21 is abutted against thrust plate 17 for actuating a master brake cylinder fixed to the front face of the booster housing.

In this configuration, the metal cup 11 is preferably provided with an opening in its bottom whose diameter corresponds to that of an annular collar 15 at the front section 7, such that the annular collar 15 projects into the metal cup 11. The axial length of the collar 15 is slightly greater than the material thickness of the bottom of the metal cup 11 surrounding it, so that upon actuation the front surface of the collar 15 interacts with the reaction disc 14 as a sealing surface. The retaining clip 8 is formed in the shape of a steel bracket whose arms 22 make contact with their ends behind two projections 24, 25 which are formed radially opposite each other at the front section 7. In this context, the diaphragm disc 19 has such a configuration that in its range of fixation at the front section 7 of the control valve housing 10 it radially secures the arms 22 of the steel bracket 8 which make contact behind the projections 24, 25.

In addition to that, the steel bracket 8 is formed in its center with an opening 26 (FIG. 3) accommodating the push rod 21 which passes into an axially extending guide attachment 27.

The vacuum brake power booster of tandem design shown in FIG. 2 provides in its housing a partition wall 46 which divides two booster chambers 47, 48 from each other. A second movable wall 51 subdivides the second booster chamber 48 into a second vacuum chamber 49 and a second power chamber 50. The second movable wall 51 is in power-transmitting connection with the control valve housing 10 by means of a guide tube 28 which is sealedly guided in the partition wall 46. The metal cup 11 is axially abutted against the control valve housing 10 and is guided in tube 28. The steel bracket 8, having arms 22 retaining the metal cup 11, is radially secured in the range of fixation of the guide tube 28 to the control valve housing 10 by a radial abutment of the inside wall of the guide tube 28. The metal cup 11 has cutouts 29 formed at its edge. In order to render possible an evacuation of the power chambers 23, 50, the control valve housing 10 is furnished with two radially opposed vacuum ducts 44 (FIG. 3, lower half) in its ranges positioned between the projections 24, 25.

Figure 4:
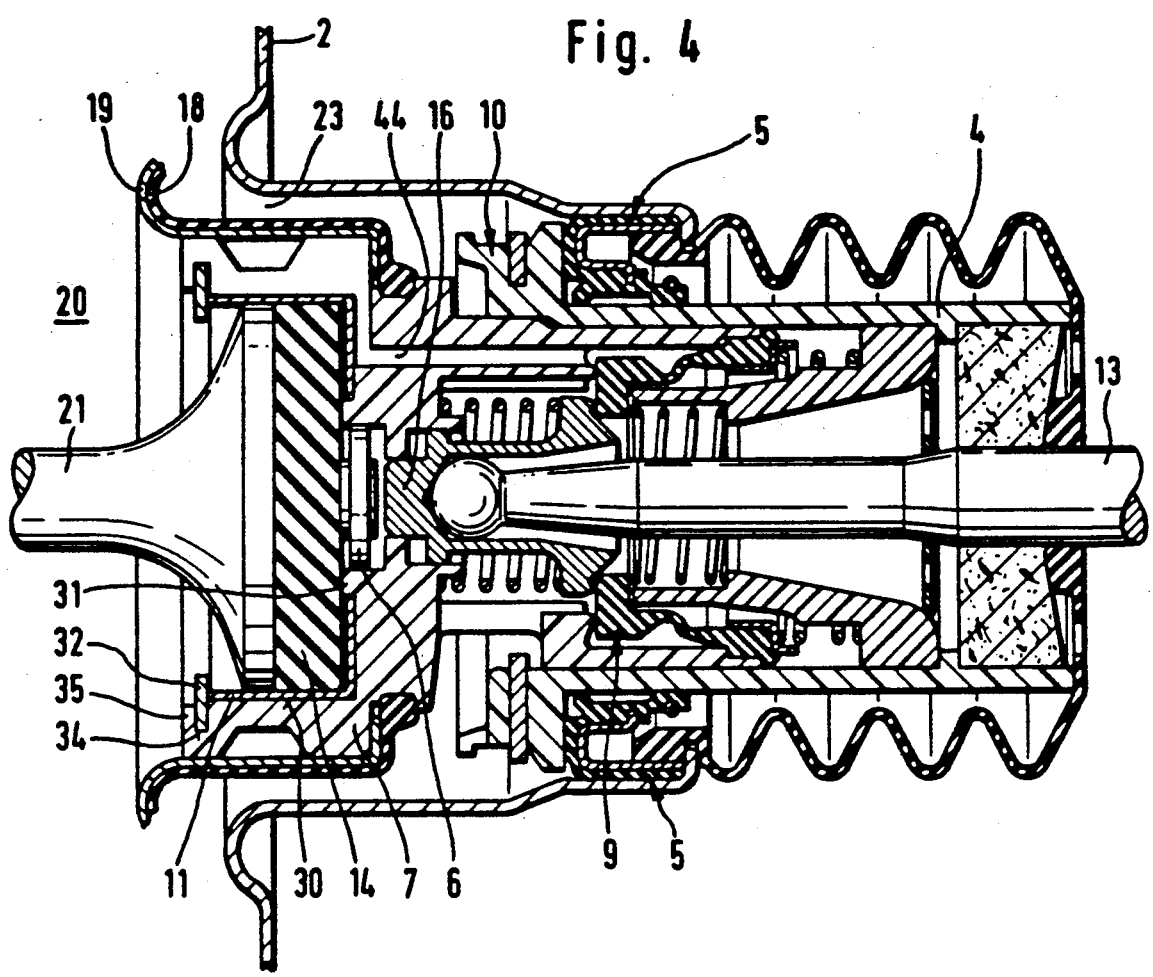
FIG. 4 shows a part-longitudinal section along the line B—B through a second embodiment of a vacuum brake power booster with another mode of fixation of the metal cup according to the invention.
Figure 5:
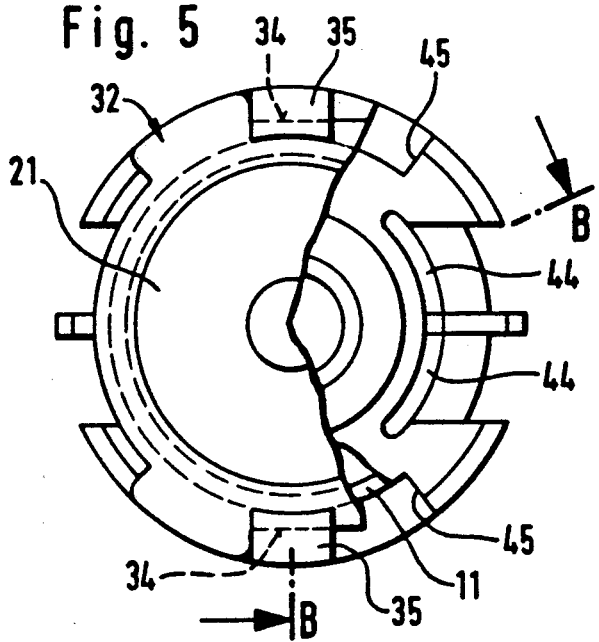
FIG. 5 shows a partial view of the control assembly in the direction of arrow C in FIG. 4.
Figure 6:
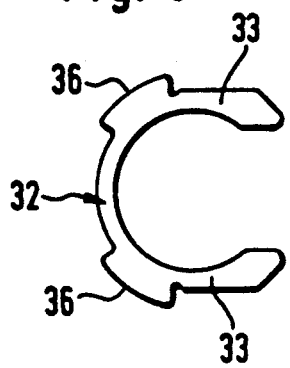
FIG. 6 shows a top view of a retaining member which is employed in the second embodiment of the mode of fixation of the metal cup according to the invention.

In another embodiment of the vacuum brake power booster illustrated in FIGS. 4, 5 and 6, the metal cup 11 is positioned in a recess 30 disposed in the front section 7 of the control valve housing 10. The bottom of the recess 30 presents a projected ring-shaped collar 31. The collar 31, whose axial length is slightly larger than the material thickness of the metal cup 11, interacts with the reaction disc 14 and safely seals off the vacuum chamber 20 with respect to the power chamber 23. Axial fixation of the metal cup 11, which is inserted in the control valve housing 10, is provided by a retaining member 32. The retaining member 32 is slidable into the control valve housing 10 in radial direction and preferably has a U-shaped configuration with two arms 33 extending parallel to each other that in the assembled condition engage, with a prestress in radial direction, grooves 34 formed in the control valve housing.

The grooves 34 are bounded by two retaining elements 35 which are formed in an annular segment shape radially opposite each other at the front section 7. If and when the U-shaped retaining member 32 is intended for use in a tandem brake power booster which is furnished with the guide tube 28 mentioned above, then it will be appropriate to furnish the retaining member 32, in its range positioned outside the two arms 33, with guide edges 36 whose contour corresponds to the inside wall of guide tube 28.

Finally, the metal cup 11 is furnished at its edge with two opposed locking apparatuses 37, 38 that interact in the assembled condition with the retaining elements 35 which are formed on the control valve housing 10 which is partially illustrated in FIG. 7. Each locking apparatus 37, 38 is provided with a straight locking section 39 extending radially toward the outside which, upon incorporation of the metal cup 11 in the control valve housing 10, is introduced into the groove 34 defined by the retaining element 35 by rotating the control valve housing 10. The locking section 39 is preferably positioned between two antirotating means 40, 41 which may, for example, be configurated in the shape of spring notches (right hand half of the metal cup 11) which, in the event of a rotating motion of the metal cup 11, are urged down by their engaging the retaining elements 35, and which project on either side of the associated retaining element 35 upon the introduction of the locking section 39 into the groove 34. The distance of the two notches preferably corresponds approximately to the width of the retaining element 35.

The left hand half of the metal cup 11, when viewing the drawing, shows a slightly modified design of the locking apparatus 38 in which the one antirotating means 40 is formed by a spring notch, while the other antirotating means 41 is formed in the shape of an axially extending supporting area 42 that is positioned at right angles with the locking section 39 and which forms one part with the locking section 39.

In order to be able to effectively secure the push rod (not illustrated in this Figure) against falling out, radial depressions 43 are provided in the edge ranges of the metal cup 11 positioned between the locking apparatuses 37 and 38, one of which is illustrated diagrammatically in FIG. 7.

In order to create favorable flow conditions, in particular during evacuation of the power chamber 23, axial cutouts 45 are provided in the control valve housing 10 in the range between the retaining elements 35. The axial cutouts extend down to the bottom of the recess 30 into the range of the mouth of the air guide ducts 44.

While certain embodiments of the invention have been described in detail above in relation to a vacuum brake power booster, it will be apparent to those skilled in the art that the disclosed embodiments may be modified. Therefore, the foregoing description is to be considered exemplary rather than limiting, and the true scope of the invention is that defined in the following claims.

What is claimed is:

1. A vacuum brake power booster for automotive vehicles, comprising:
   a housing;
   a movable wall sealingly subdividing said housing into at least one vacuum chamber and at least one power chamber and movable forwardly and rearwardly of said housing along a central axis;
   a return spring prestressing said wall;
   control valve means for controlling the pressure differential between said power chamber and said vacuum chamber, and
   including a control valve housing made of thermoplastic material mounted in said wall for movement therewith along said axis;
   a generally cylindrical metal cup having a bottom engaging the front side of said control valve housing and projecting forwardly from said housing coaxially of said axis;
   a reaction disc of high-elasticity material received within said metal cup;
   a push rod abutted against said reaction disc within said cup, said push rod transmitting brake power to an actuating piston of a master brake cylinder positioned on a vacuum side of said housing; and
   retaining means for retaining said metal cup in a positive locking fit with said control valve housing, said retaining means comprising a retaining clip constituted by a U-shaped steel bracket having a central through opening for said push rod and arms with outer ends seated behind two radial rearwardly facing projections radially opposite each other on said control valve housing.

2. The vacuum brake power booster of claim 1, wherein said bracket is provided with an axially extending guide attachment adjacent said through opening.

3. The vacuum power booster of claim 1, further comprising an annular collar projecting coaxially forwardly from the front side of said housing through an opening in the bottom of said metal cup into sealing engagement with said reaction disc.

4. The vacuum brake power booster of claim 1, wherein said arms of said steel bracket are radially secured by said movable wall fixed to said control valve housing.

5. The vacuum brake power booster of claim 1, further comprising:
   a partition wall subdividing said housing into a front booster chamber and a rear booster chamber;
   a first movable wall positioned at said control valve housing and subdividing said front booster chamber into a first vacuum chamber and a first power chamber;
   a second movable wall subdividing the rear booster chamber into a second vacuum chamber and a second power chamber;
   a guide tube connecting said second movable wall to said control valve housing, said guide tube being sealedly guided in said partition wall, said metal cup having an outwardly projecting radial flange of an outside diameter which corresponds to the inside diameter of said guide tube, said flange of said metal cup being formed with radial cutouts; and
   said retaining means is secured in radial direction by said guide tube adjacent said connection of said guide tube to said control valve housing.

6. The vacuum brake power booster of claim 1, wherein said metal cup is positioned within the forwardly opening cylindrical recess, said control valve housing, the bottom of said recess having a forwardly projecting annular collar projecting forwardly through an opening in the bottom of said metal cup into sealing engagement with said reaction disc.

7. The vacuum brake power booster of claim 6, wherein said retaining means is a retaining member slidable into recess means in said control valve housing in radial direction.

8. The vacuum brake power booster of claim 7, wherein said retaining member has a U-shaped configuration with arms engaging within grooves in said control valve housing constituting said recess means with a prestress in radial direction.

9. The vacuum brake power booster of claim 8 wherein said grooves are bounded by two annular segment-shaped retaining elements disposed radially opposite each other on said control valve housing.

10. The vacuum brake power booster of claim 7, further comprising a second movable wall connected to said control valve housing by means of a guide tube, wherein said retaining element is formed with guide edges to interact with an inside wall of said guide tube.

11. The vacuum brake power booster of claim 6, wherein said metal cup is provided at its open edge with at least two locking means arranged radially opposite each other to interlock with retaining elements defining circumferentially extending radially upwardly opening grooves on said control valve housing.

12. The vacuum brake power booster of claim 11, wherein each said locking means is comprised of a rigid radial locking section and two axially projecting resilient antirotating means, said locking section in an assembled condition being seated in said grooves of said retaining elements and said antirotating means being engaged with the circumferentially opposite end of said retaining elements.

13. The vacuum brake power booster of claim 12, wherein both said antirotating means are formed in the shape of spring notches.

14. The vacuum brake power booster of claim 12, wherein one of said two antirotating means is formed in the shape of a spring notch, while the other of said antirotating means is formed by an axial supporting area positioned at right angles with respect to said locking section and which forms one part with said locking section.

15. The vacuum brake power booster of claim 11 wherein said metal cup is furnished with radial depressions in edge ranges positioned between said locking apparatuses.

16. The vacuum brake power booster of claim 11 wherein between said retaining elements, said control valve housing is furnished with axial cutouts extending rearwardly from the front end of said housing into a mouth of air guide ducts disposed in said control valve housing.

* * * * *